United States Patent [19]

Schluderberg

[11] 3,847,735

[45] Nov. 12, 1974

[54] NUCLEAR REACTOR SAFETY SYSTEM

[75] Inventor: Donald C. Schluderberg, Lynchburg, Va.

[73] Assignee: The Babcock & Wilcox Company, New York, N.Y.

[22] Filed: Dec. 12, 1972

[21] Appl. No.: 314,483

Related U.S. Application Data

[63] Continuation of Ser. No. 53,753, July 10, 1970, abandoned.

[52] U.S. Cl. .................................. 176/38, 176/63
[51] Int. Cl. ........................................... G21c 15/18
[58] Field of Search .................... 176/38, 37, 62, 63

[56] References Cited
UNITED STATES PATENTS

| | | | |
|---|---|---|---|
| 3,115,450 | 12/1963 | Schanz | 176/37 |
| 3,528,884 | 9/1970 | Collier et al. | 176/37 |
| 3,580,806 | 5/1971 | Weems et al. | 176/37 |
| 3,666,616 | 5/1972 | Schluderberg | 176/38 |
| 3,718,539 | 2/1973 | West et al. | 176/37 |
| 3,926,127 | 2/1960 | McCorkle | 176/38 |

FOREIGN PATENTS OR APPLICATIONS

| | | | |
|---|---|---|---|
| 1,589,740 | 5/1970 | France | 176/37 |

Primary Examiner—Harvey E. Behrend
Attorney, Agent, or Firm—Joseph J. Maguire, Esq.; Gary L. McMinimee, Esq.; Robert J. Edwards, Esq.

[57] ABSTRACT

An improvement in the method and apparatus for suppressing vapor pressure buildup within a nuclear reactor containment structure housing a pressurized water nuclear reactor and steam generating equipment during a loss of coolant accident resulting from a rupture of the primary coolant system. The improved method comprises continually maintaining the temperature of the primary coolant within the primary coolant system below the saturation temperature of the primary coolant corresponding to the pressure then prevailing within the primary system during the accident. The novel apparatus provided for practicing the method includes a source of an emergency coolant and equipment for serially injecting separate portions of the emergency coolant from the source into the primary coolant system, each portion being injected in response to a separate corresponding predetermined value of a characteristic of the primary coolant system.

2 Claims, 1 Drawing Figure

PATENTED NOV 12 1974
3,847,735
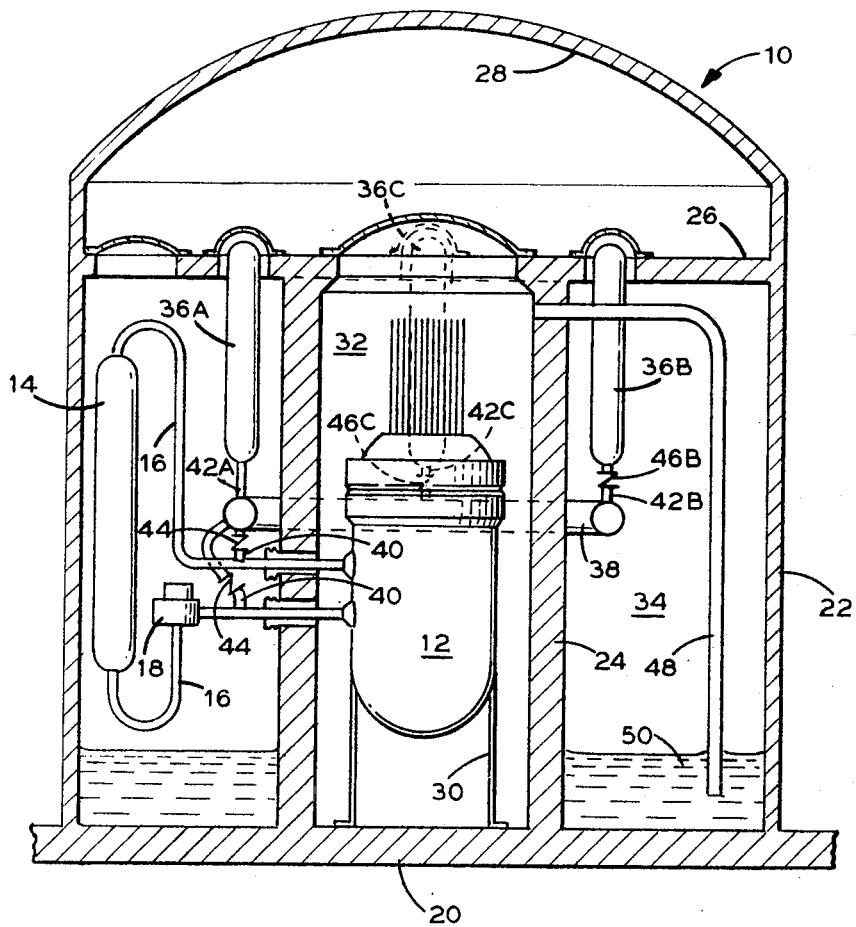
INVENTOR.
Donald C. Schluderberg
BY
*J. Maguire*
ATTORNEY

NUCLEAR REACTOR SAFETY SYSTEM

This is a continuation of application Ser. No. 53,753 filed July 10, 1970, now abandoned.

BACKGROUND AND SUMMARY OF THE INVENTION

This invention relates to nuclear reactor containment systems and more specifically to systems for suppressing vapor pressure buildup within the containment structure in the event of a rupture in the primary coolant system.

Reactor systems are generally enclosed in containment structures made of either concrete or steel in order to limit or totally prevent radioactive material such as steam or water, solid or dissolved fission products, or gaseous or vaporized fission products from escaping from the vicinity of the reactor complex in the event of a reactor accident. Alternate approaches to containment design require the structure to be either a relatively thin-walled enclosure of a large volume or thick-walled enclosure of a small volume. In the former case, low pressures would be developed within the structure in the event of an accident; whereas in the latter case, high pressures would be developed. In either case, the containment represents a considerable portion of the total cost of a nuclear reactor plant since the containment structure is designed to prevent the escape of vapor generated when an accident occurs which releases substantially all of the primary coolant of the reactor system.

In the prior art, ancillary equipment has been provided to suppress vapor pressure within the containment with a view of reducing the cost of construction of a given containment. The savings are realized on the theory that if the vapor pressure can be rapidly suppressed, a given containment can be designed to withstand a lower pressure. On the other hand, if the containment is not re-designed in consideration of the use of such ancillary equipment, its use can be readily justified on the basis of being a safety feature that contributes to the overall safe operation of a nuclear reactor complex, a consideration of particular importance to the industry, since it is highly desirable to locate nuclear reactor installations in metropolitan areas.

The present invention is concerned with a method and apparatus for suppressing vapor pressure buildup within a containment structure housing a pressurized water nuclear reactor and steam generating equipment, operated so that the temperature of the primary coolant is less than the saturation temperature of the primary coolant at the operating pressure, the method being effective during a loss of coolant accident resulting from a leak or rupture in the primary system. Prior art systems have attempted to condense the vaporized coolant; this invention, on the other hand, provides a system for inhibiting the vaporization of the coolant.

The method according to the present invention comprises maintaining the temperature of the primary coolant within the primary coolant system below the saturation temperature of the primary coolant corresponding to the pressure within the primary system. Whereas in prior art systems the primary coolant was permitted to attain the saturation temperature corresponding to the pressure prevailing within the primary system and thus to flash, thereby ejecting substantially all of the primary coolant from the primary system, the method according to this invention effectively prevents the flashing of the primary coolant in the primary system, thereby reducing the rate and total quantity of vapor generated in the containment structure. Furthermore, the possibility of core unflooding can be eliminated and the tendency for primary pump cavitation reduced.

According to a preferred embodiment of the invention the method includes the cooling of the primary coolant in the vicinity adjacent the rupture below the saturation temperature of the primary coolant corresponding to the pressure prevailing within the containment structure. This serves to inhibit the vaporization of the primary coolant at the rupture point.

According to another preferred embodiment of the invention the method includes serially injecting separate portions of an emergency coolant into the primary system, each portion being injected in response to a separate corresponding predetermined value of a characteristic of the primary system. The serial injection of the coolant is desirable, since it limits the thermal shock on the primary system.

Novel apparatus for practicing the method is provided and includes a source of emergency coolant and equipment for serially injecting separate portions of the coolant from the source into the primary system, each portion being injected in response to a separate corresponding predetermined value of a characteristic of the primary coolant system.

BRIEF DESCRIPTION OF THE DRAWING

The drawing is a sectional view of a reactor containment illustrating an embodiment of the invention.

BRIEF DESCRIPTION OF THE PREFERRED EMBODIMENTS

Referring to the drawing, there is shown a containment structure 10 which houses steam generating equipment including a pressurized water nuclear reactor 12 and heat exchanger 14 connected in primary coolant flow communication with one another via an arrangement of conduits 16, one of which contains a circulating pump 18. The containment shown is illustrative of a typical enclosure for housing a nuclear reactor steam generating system and is intended to be representative of other forms of enclosures to which the improved pressure suppression arrangement hereinafter described may be adapted. In the illustrated embodiment the containment structure 10 is a compartmentalized enclosure with a base portion 20, an outer wall 22, an inner wall 24, and a suitably shaped roof 28.

The reactor coolant system is a simplified schematic of the primary coolant system of a pressurized water reactor complex and is of that type operated so that the temperature of the primary coolant is less than the saturation temperature at normal operating pressure. The reactor control system, additional primary coolant loops, and the pressurizer and other equipment well known in the art have been eliminated in order to simplify the discussion.

With the reactor system shown, the reactor 12 is disposed centrally of the containment and supported in place over the base 20 of the containment on a cylindrically shaped skirt 30. The inner wall 24 laterally encircles the reactor 12, acting as a primary shield and forming the upright wall portion of an inner compartment 32 which encloses the space immediately surrounding the reactor 12, since the wall 24 is also laterally spaced apart from the outer wall 22, it forms the inner upright wall portion of an outer annular compartment 34. The heat exchanger 14 is located in this outer compartment 34. The base 20 of the containment and a subroof, generally indicated at 26, complete compartments 32 and 34, hereinbefore described.

In accordance with the invention there is provided equipment ancillary to the steam generating equipment for maintaining the temperature of the primary coolant within the primary coolant system below the saturation temperature of the primary coolant corresponding to the pressure within the primary system during the accident. This equipment includes apparatus fo serially injecting separate selected amounts of an emergency coolant from a source into the primary coolant system, each of the amounts being injected in response to a separate corresponding predetermined value of a characteristic of the primary coolant system. In the illustrated embodiment, the equipment is shown as including supply tanks 36A, 36B, and 36C, an annular header 38, and a plurality of injection conduits 40.

The supply tanks 36A, 36B, and 36C contain emergency cooling fluid. In a preferred embodiment the fluid is water or borated water, boron in the form of boric acid being added to the water to reduce the possibility of a post accident criticality of the reactor. The total quantity of fluid required will depend on the overall installation design. While in the embodiment shown the fluid is not cooled below the ambient temperature within the containment which is here about 100° F, it would not be departing from the scope of the invention to provide cooling equipment and in some instances such equipment may reduce the quantity of fluid required.

The supply tanks 36A, 36B, and 36C are connected in flow communication with the annular header 38 via connectors 42A, 42B, and 42C respectively. The annular header 38 provides a manifold system that readily adapts itself to being tied into a plurality of primary coolant loops and a plurality of supply tanks.

Flow communication between the annular header 38 and the primary coolant system is provided by injection conduits 40. As shown, the injection conduits 40 are located adjacent the reactor inlet and outlet of the illustrated coolant loop. This construction, however, may not be the most desirable design for a specific system and other injection conduits may be provided and may be located at other points in the primary coolant loop. Furthermore, it may be desirable to provide a multiplicity of injection points with a view towards anticipating possible rupture points and cooling the primary coolant in the vicinity of the rupture below the saturation temperature of the primary coolant corresponding to the pressure within the containment structure.

While during normal operations the annular header 38 is filled with fluid, flow between the header 38 and the primary coolant system is prevented by injection check valves 44 mounted in the injection conduits 40.

In the embodiment shown the primary coolant system normally operates at a pressure of about 2,200 psia and a maximum temperature of about 604° F. Since the saturation temperature of the primary coolant corresponding to the operating pressure is about 649° F it will be noticed that during normal operations the primary coolant is generally maintained about 45° F below the saturation temperature.

The tanks 36A, 36B, and 36C are pressurized with a gas, e.g., nitrogen, to superatmospheric pressures, i.e., 1,600 psia, 800 psia, and 300 psia respectively. Since tank 36A is in direct flow communication with the annular header 38 during normal operations, it will be apparent that the pressure within the annular header 38 will be the same as the pressure within tank 36A, i.e., 1,600 psia. The fluid within tanks 36B and 36C is separated from the fluid within annular header 38 by means of tank check valves 46B and 46C.

In the event of a loss of coolant accident, primary coolant is lost from the primary system reducing the pressure within the system; the temperature of the primary coolant, on the other hand, remains substantially the same until the emergency coolant has begun to be injected into the primary system. Injection check valves 44 are set to permit flow from the annular header into the primary system when the pressure within the primary system has dropped to 1,600 psia. Just prior to the injection of the emergency coolant, it will be noticed that since the temperature of the primary coolant will be about 604° F and since the saturation temperature of the primary coolant corresponding to 1,600 psia is about 605° F, the temperature of the primary coolant will be less than its saturation temperature at the injection pressure. After injection has begun the pressure within the primary system will continue to drop, and the pressure within the header will be reduced at the same rate. When the pressure within the header has been reduced to 800 psia, tank check valve 46B will permit flow of fluid from tank 36B through connector 42B into the annular header 38. When the pressure within the header 38 has been reduced to 300 psia tank check valve 46C will permit flow of fluid from tank 36C through connector 42C into the annular header 38. During injection a sufficient quantity of the emergency coolant is introduced into the primary system to continually maintain the temperature of the primary coolant below the saturation temperature of the primary coolant corresponding to the pressure prevailing within the primary system.

It will be apparent from the foregoing, the system provides for automatic injection of 100° F water into the primary system starting at the time the pressure within the primary system has fallen to 1,600 psia and continuing until the pressure within the primary system has become equalized with the containment pressure. Mixing of the 100° F water into the primary system reduces the rate and total quantity of vapor generated in the containment by reducing the temperature of the primary coolant at a rate sufficient to maintain the temperature of the primary coolant below the saturation temperature of the primary coolant corresponding to the pressure prevailing within the primary system. This dilution of the primary coolant avoids development of steam pockets, thereby reducing the possibility of core unflooding and primary pump cavitation. The serial injection limits the thermal shock on the system. Also, there may be provided a multiplicity of injection points with a view towards inhibiting vapor pressure buildup by cooling the primary coolant in the vicinity of a rupture below the saturation temperature of the primary coolant corresponding to the pressure prevailing within the containment structure. The multiplicity of injection points also results in more uniform cooling of the primary coolant thus reducing the possibility of a "cold water accident." Furthermore, it will be noticed that this invention may be used in conjunction with other apparatus for suppressing vapor pressure buildup. For example, in the illustrated embodiment a pool of water 50 is provided in compartment 34 to condense some of the condensible vapors. Tube 48 is provided to equalize the pressures within compartments 32 and 34.

What is claimed:

1. In combination with a nuclear reactor, a pressurized primary coolant system comprised of a plurality of primary coolant loops operatively connecting the reactor to heat exchanger means, a containment structure housing said reactor, heat exchanger and coolant system, the improvement comprising an apparatus located within the containment structure for suppressing the buildup of vapor pressure therein including a plurality of tanks, a header operatively associated with the tanks, a cooling fluid being stored in said header and tanks, the header being disposed in open fluid communication with one of said tanks and in fluid receiving relation with the remaining tanks, each of the tanks containing a gas at superatmospheric pressure for pressurizing the fluid stored therein and in said header, the fluid pressure being different in each of the tanks and lower than the primary coolant operating pressure, the fluid pressure in said one tank and header being higher than that of the remaining tanks, a separate connector flow connecting each of the tanks to said header, a first check valve disposed in each of the connectors associated with the remaining tanks, said first check valve being normally closed by the fluid pressure in the header, a plurality of conduits flow connecting the header with said primary coolant loops, each of said conduits entering the system at a different location, a second check valve disposed in each of the conduits, said second check valve being normally closed by the primary coolant operating pressure, said second check valve becoming open when the primary coolant pressure decreases to the level corresponding to the fluid pressure in said one tank and header, and said first check valve becoming open when the primary coolant pressure decreases to the level corresponding to the fluid pressure in the tank associated therewith.

2. A method for suppressing vapor pressure build-up in the event of a primary coolant system failure within a nuclear reactor containment structure including a plurality of tanks, said primary coolant system comprised of a plurality of primary coolant loops, a header disposed in open fluid communication with one of said tanks and in fluid receiving relation with the remaining tanks, a separate connector flow connecting each of the tanks to said header, a first check valve disposed in each of the connectors associated with the remaining tanks, said first check valve being normally closed by the fluid pressure in the header, a plurality of conduits flow connecting the header with said primary coolant loops, a second check valve disposed in each of the conduits, said second check valve being normally closed by the primary coolant operating pressure, and comprising the steps of:

storing a cooling fluid in said header and tanks under a gas at superatmospheric pressure, which pressure is lower than the primary coolant operating pressure, said gas pressure being different in each of the tanks and being highest in said one tank and header, injecting the cooling fluid from said one tank and header into the primary coolant system by way of the second check valve which opens when the primary coolant pressure decreases to a level corresponding to the fluid pressure in said one tank and header, sequentially injecting the cooling fluid from the remaining tanks by way of the first check valve which opens when the primary coolant pressure decreases to a level corresponding to the fluid pressure in the tank associated therewith.

* * * * *